April 19, 1932. F. BAUMBACH 1,854,920
BARK PEELING MACHINE
Filed July 27, 1929 2 Sheets-Sheet 1

Inventor:
Friedrich Baumbach
by *his* ATTORNEY

April 19, 1932.　　　F. BAUMBACH　　　1,854,920

BARK PEELING MACHINE

Filed July 27, 1929　　2 Sheets-Sheet 2

INVENTOR
Friedrich Baumbach
BY
his ATTORNEY

Patented Apr. 19, 1932

1,854,920

UNITED STATES PATENT OFFICE

FRIEDRICH BAUMBACH, OF MANNHEIM-WALDHOF, GERMANY, ASSIGNOR TO ZELLSTOFFFABRIK WALDHOF, OF MANNHEIM-WALDHOF, GERMANY

BARK PEELING MACHINE

Application filed July 27, 1929, Serial No. 381,431, and in Germany August 9, 1928.

This invention relates to machines for removing bark from wood or other stems.

A well known construction of such machines comprises a cutter grooved at its peripheral edge and having bits arranged at a definite angle to the axis of the cutter. Hitherto these bits have had straight cutting edges so that the scope of the action of the cutter is dependent on the angle of the bits and with a definite cutting edge only stems of a substantially uniform diameter can be treated. Further, the stems are pressed against the bits in the groove usually by a spiked head inclined relatively to the cutter. With such an arrangement it is essential to provide continuous supervision of the bark removing operation.

One object of the invention is to provide a machine wherein stems having different diameters can be operated on by means of one and the same cutter.

The invention will be hereinafter described with reference to the accompanying diagrammatic drawings in which:—

Figures 1, 2:
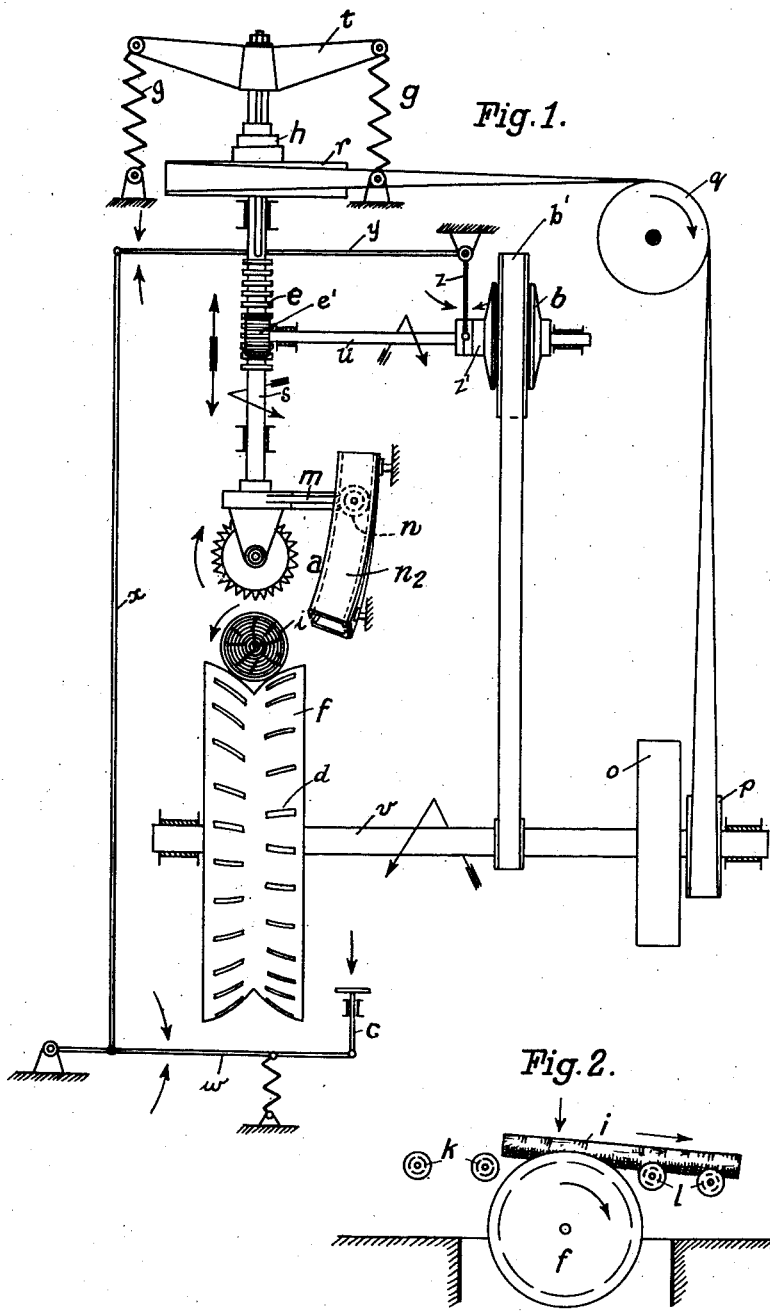
Fig. 1 shows a front elevation of the bark removing machine of the invention in diagrammatic form.
Fig. 2 is a side elevation of part of the bark removing machine.
Figure 3:
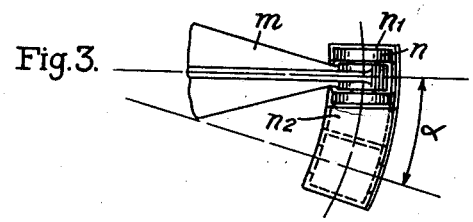
Fig. 3 shows in plan view the cam means for angular adjustment of the spiked head.
Figure 4:
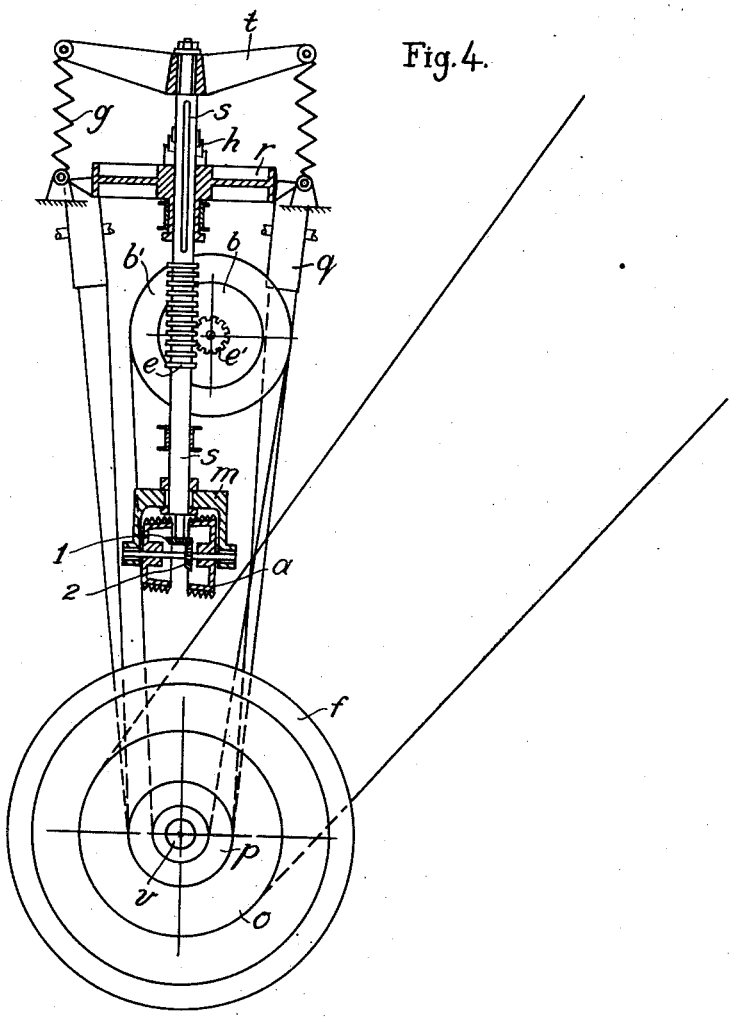
Fig. 4 is a part sectional elevation of the driving arrangements seen at an angle of 90° relative to Fig. 1.

Referring to the drawings $f$ denotes the cutter which is provided at its periphery with a groove having convex convergent walls and is mounted on a shaft $v$ driven by means of belt pulley $o$. The cutter $f$ is provided with a number of bits $d$ and in order to enable stems of different diameters to be treated on one and the same machine with equal facility the profile of the bits is constructed of outwardly curved or convex shape. The curvature of the profile is obvious in Fig. 1 of the drawings from the curvature of the groove in the periphery of the cutter $f$.

The stem or branch $i$ which is to be treated is fed on to the cutter $f$ in any suitable manner such as for example along rollers $l$ and $k$ clearly shown in Fig. 2. The rollers $k$ are arranged in front of the cutter $f$ taken in the direction of movement of the stem and after treatment the stem is supported by the rollers $l$ which are preferably arranged in a plane inclined to the horizontal in a downward direction from the groove of the cutter $f$ so that the stem after treatment automatically slides down on the rollers $l$.

The stem $i$ is pressed against the bits $d$ of the cutter $f$ by means of a spiked head $a$ of known type which is arranged above the axis of the cutter $f$ and is adapted for vertical reciprocating movement. The spiked head $a$ is driven by a belt drive from the shaft $v$ passing over belt pulleys $p$, $q$, $r$ which rotates shaft $s$, the rotation of the latter being transferred by means of bevel gears 1 and 2 to the spiked head $a$. The pressure exerted by the spiked head $a$ against the stem $i$ is produced by its own weight, this pressure being however reinforced by the action of two springs $g$ which act on a cross head $t$ arranged on a vertical shaft $s$.

A cylindrical rack $e$ is formed on the shaft $s$ of the spiked head $a$ with which a pinion $e'$ secured to the shaft $u$ engages.

The spiked head $a$ presses against the stem $i$ which is to be peeled and feeds it forward more or less quickly according to its angular adjustment relatively to the longitudinal axis of the stem.

The angular adjustment of the spiked head $a$ is effected by the lever $m$ and the guide rollers $n$ secured thereto, which latter are guided with two curved plates $n^1$ $n^2$ so that on the downward travel of the spiked head the lever $m$ carrying the spiked head $a$ is rotated through an angle $\alpha$. The spiked head is turned through this angle $\alpha$ when it reaches its lower end position and in this position the head $a$ moves the stem forward at a rate suitable for a stem having the smallest diameter which can be treated.

At the upper end of its stroke the spiked head $a$, as regards its axis, is positioned by means of the curved guides to lie substantially at right angles to the axis $v$ of the cutter and nearly parallel to the stem axis, the angle α thus having its smallest value. The position corresponds to the velocity of travel of the stem having the largest diameter, that is to say, the forward feeding action is such that the stems are moved only slowly forward.

When the treatment of the stem is completed, the spiked head $a$ sinks by its own weight into a lower position in which it prevents the passage of the next stem. When said next stem is fed forward it becomes necessary to lift the spiked head through a certain distance. Such lifting is effected by the operator pressing the pedal $c$ which, by virture of the linkage system of rod $w$, $x$, $y$, $z$, moves a clutch member $z'$ into engagement with a clutch disc $b'$ driven by the shaft $v$. By virtue of this short coupling movement the shaft $u$ is momentarily rotated and thereby the spiked head shaft $s$ is lifted.

As soon as the oncoming stem reaches the cutter and the cutting operation is ready to begin the operator releases the pedal $c$ with the result that the shaft $u$ is no longer rotated and the spiked head sinks down on to the foremost end of the stem. The bark removing operation and the feeding of the stem by the spiked head then begins.

The force exerted by the spiked head on the stem $i$ is larger, the larger the diameter of the stem. This pressure is produced by the two springs $g$ which are tensioned more strongly with a higher position of the spiked head.

The buffer spring $h$ is provided below the cross head $t$ in order to cushion the heavy impact of the spiked head when falling into its lowest position.

It will be apparent from Figure 1 of the drawings that the cutting edges of the bits are convex in shape and are curved in such manner as to allow logs of different diameters to be treated when fed tangentially into the groove of the cutter by virtue of contacting with different portions of said convex curved cutting edges. This is more particularly effected by the arrangement of the bits in opposite walls of said groove in such a way that the chords of their curved cutting edges lie at substantially 90° to one another. The walls of the peripheral groove of the cutter are also formed in a corresponding manner. With bits having cutting edges of the curvature described and arranged at the above described angle, it has been found that one peripheral cutter can operate over a range of sizes of stems which hitherto has required three or four cutters provided with straight edged bits. Further, the transmission of power to the machine elements from a single rotating shaft by means of bolts ensures the greatest possible elasticity of the machines.

What I claim is:—

1. In a machine for removing bark from a stem, the combination of a rotatable peripheral cutter having a peripheral groove to receive said stem, bits having convex cutting edges mounted on said cutter in substantially axial planes with respect to the axis of said cutter and projecting into said groove from opposite walls thereof, said bits being so arranged that the chords of their curved cutting edges lie at approximately 90° to one another, means to guide the stem into said groove and a feed roller device which rotates said stem and feeds the same axially.

2. In a machine for removing bark from a stem the combination of a rotatable peripheral cutter having a peripheral groove to receive said stem, the opposite walls of said groove being convexedly curved and convergent in such manner that the chords of such curves lie at approximately 90° to one another, bits mounted on said cutter in substantially axial planes with respect to the axis of said cutter and projecting into the groove thereof and having convex cutting edges corresponding in curvature to the walls of said groove, means to guide said stem into said groove and a feed roller device which rotates said stem and feeds the same axially.

3. In a machine for removing bark from a stem, the combination of a rotatable peripheral cutter having a peripheral groove for receiving said stem, bits having convex cutting edges mounted on said cutter in substantially axial planes with respect to the axis of said cutter and projecting into said groove from opposite walls thereof, the bits projecting from each of said walls generating a curved surface upon rotation of said cutter, the two curved surfaces so generated being such as to meet at an angle of approximately 90° if continued toward each other and means for rotating said stem and feeding the same axially to said cutter.

4. In a machine for removing bark from a stem, the combination of a rotatable peripheral cutter having a peripheral groove for receiving said stem, the walls of said groove having a convex curvature and meeting at an angle of approximately 90°, bits having convex cutting edges mounted on said cutter in substantially axial planes with respect to the axis of said cutter and projecting into said groove from said walls, the curvature of the cutting edges of each of said bits being substantially the same as the curvature of the wall from which it projects and means for rotating said stem and feeding the same axially to said cutter.

In testimony whereof I have affixed my signature.

FRIEDRICH BAUMBACH.